United States Patent [19]
Gavrun et al.

[11] 3,894,518
[45] July 15, 1975

[54] STRATIFIED CHARGE ROTARY ENGINE WITH DUAL FUEL INJECTION

[75] Inventors: Michael T. Gavrun, Bayonne; Robert E. Mount, Mendham, both of N.J.

[73] Assignee: Curtiss-Wright Corporation, Wood-Ridge, N.J.

[22] Filed: Dec. 12, 1973

[21] Appl. No.: 424,056

[52] U.S. Cl. .............. 123/8.09; 123/32 ST
[51] Int. Cl.² .............. F02B 53/10; F02B 53/12
[58] Field of Search..... 123/8.13, 8.09, 8.45, 32 ST, 123/32 JT, 32 G, 32 F, 8.11

[56] References Cited
UNITED STATES PATENTS

| | | | |
|---|---|---|---|
| 2,902,011 | 9/1959 | Hoffman | 123/32 G |
| 3,246,636 | 4/1966 | Bentele | 123/8.09 |
| 3,310,042 | 3/1967 | Haas | 123/8.09 |
| 3,508,530 | 4/1970 | Clawson | 123/8.09 |
| 3,792,692 | 2/1974 | Kiley | 123/32 G |

*Primary Examiner*—C. J. Husar
*Assistant Examiner*—O. T. Sessions
*Attorney, Agent, or Firm*—Victor D. Behn; Arthur Frederick

[57] ABSTRACT

A rotary combustion engine designed for operation as a stratified charge engine and having two fuel nozzles for discharging fuel into each engine working chamber, the fuel discharging from one of the nozzles being ignited as it discharges into an engine working chamber and the combustion flame produced by this ignition functioning as a pilot flame to ignite the fuel discharging from the other nozzle.

8 Claims, 5 Drawing Figures

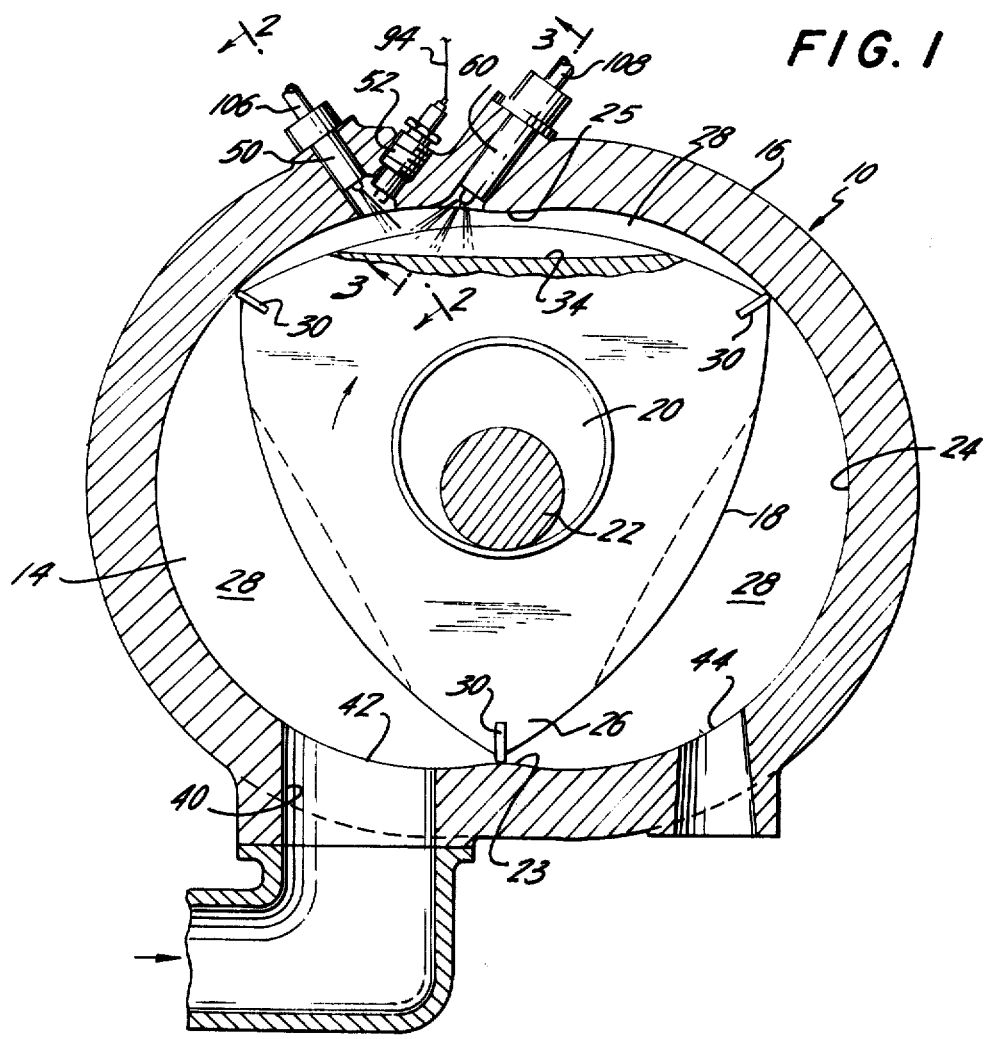

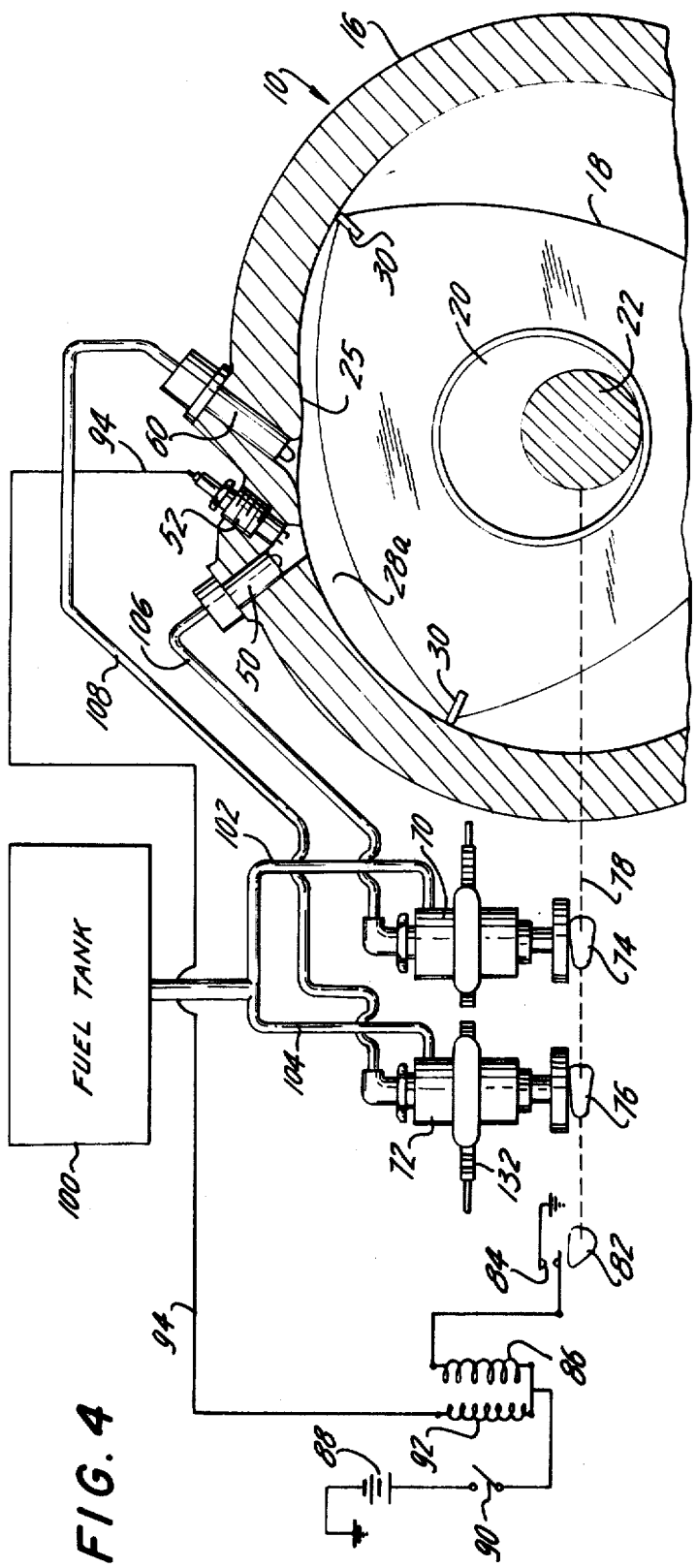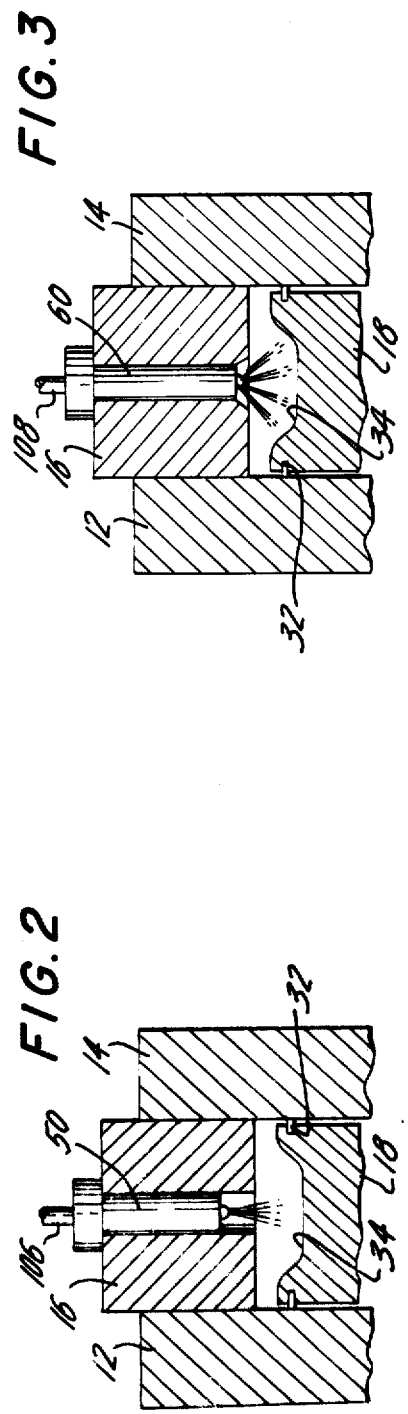

STRATIFIED CHARGE ROTARY ENGINE WITH DUAL FUEL INJECTION

BACKGROUND OF THE INVENTION

The invention relates to rotary internal combustion engines of the type disclosed in prior U.S. Pat. No. 2,988,065 and particularly to such an engine designed for operation as a stratified charge engine. Prior stratified charge rotary combustion engines of this type are disclosed in U.S. Pat. Nos. 3,246,636 and 3,698,364.

The problem of pollution resulting from the exhaust emissions discharged by internal combustion engines is well recognized today. One of the approaches for minimizing this problem is to design the engine for operation with a stratified charge. By stratified charge operation is meant that the fuel-air mixture or charge in each engine combustion chamber is not a uniform mixture and instead has at least one region where the fuel-air mixture is relatively rich. Combustion is initiated in this relatively fuel-rich mixture and this combustion is relied upon to ignite the fuel in the relatively fuel-lean region. Such use of a stratified charge type of cycle has the beneficial effect that the engine can be operated with a leaner over-all fuel-air ratio than is normally possible with an engine having a uniform fuel-air mixture. Compared to engine operation at approximately a stoichiometric fuel-air ratio, engine operation on a leaner fuel-air ratio results in a significant reduction of both the oxides of nitrogen (NOx) and carbon monoxide in the engine exhaust and generally in some reduction of the hydrocarbons and also results in a reduction in engine fuel consumption.

In a stoichiometric mixture of a gasoline fuel and air, the fuel-air ratio by weight is approximately 0.067. A charge having a fuel-air ratio of less than about 0.055 cannot be consistently ignited by a spark-type igniter. Conventional non-stratified charge internal combustion engines, both of the rotary and reciprocating piston types, generally operate with a fuel-air ratio in the range of 0.06 to 0.09. A stratified charge rotary engine, however, of the configuration disclosed in the aforementioned U.S. Pat. Nos. 3,246,636 and 3,698,364 has been successfully operated at the extremely low over-all fuel-air ratio of approximately 0.015.

Difficulty, however, has been experienced in operating the rotary combustion engine configuration disclosed in U.S. Pat. Nos. 3,246,636 and 3,698,364 over the entire operating range with both completely acceptable firing regularity and good engine performance.

SUMMARY OF THE INVENTION

Accordingly, an object of this invention is to provide a rotary combustion engine designed for operation on a new and improved stratified charge fuel injection system so that the engine can be operated efficiently and smoothly on a range of lean over-all fuel-air ratios throughout the engine operating range.

Another object of the invention is to provide a new and improved rotary combustion engine designed for operation on a stratified charge and to provide a method of operating such an engine in which a portion of the fuel is discharged into each working chamber through a first nozzle and is ignited as it discharges into a working chamber and the remaining or main portion of the fuel is injected through a second nozzle, the main portion of the fuel being ignited by the combustion flame produced by said initial portion.

A further object of the invention is to provide a new and improved rotary combustion engine designed for operation on a stratified charge and in which the fuel is discharged into each engine working chamber through a pair of fuel injection nozzles after the air intake charge has been substantially compressed, with the fuel from one of the nozzles being ignited as it discharges into a working chamber and serving as a pilot flame to ignite the fuel discharging from the other nozzle and in addition in which the engine air intake passage preferably is characterized by the absence of any air throttle valve.

In accordance with the invention, a rotary combustion engine is provided with two fuel nozzles for discharging fuel into each engine working chamber after the air charge therein has been substantially compressed, with the initial portion of the fuel being discharged into the working chamber through a first nozzle and a spark-type igniter is disposed preferably immediately adjacent to the first nozzle for igniting this fuel close to its point of discharge as it discharges from the nozzle. The physical arrangement of this first nozzle and igniter is generally similar to that shown in the aforementioned U.S. Pat. No. 3,246,636. In addition, a second fuel nozzle is disposed adjacent to the first nozzle and its igniter. The main engine fuel supply is from this second nozzle and is controlled so that this second nozzle discharges fuel in a timely manner relative to the discharge and ignition of fuel from the first nozzle. As a result, the combustion flame of the fuel discharging from the first nozzle is effective as a pilot flame to ignite the fuel discharged from the second nozzle. Means are also provided to vary the quantity of fuel discharged by the second fuel nozzle into each working chamber to vary the power output of the engine. The air intake for the engine preferably is characterized by the absence of any air throttle valve whereby the usual intake throttle losses in an engine having such a valve are avoided.

The second or main fuel nozzle, which is controlled to regulate the engine power output, preferably is a showerhead-type nozzle such as disclosed in the aforementioned U.S. Pat. No. 3,698,634. The first nozzle, however, may be a simpler nozzle, for example, having but a single discharge orifice or may have a number of orifices for producing a coplaner or fan-like pattern across each working chamber. In any case, said first fuel nozzle is disposed so that a portion of the fuel vapor resulting from the fuel discharging from the nozzle passes in close proximity to the igniter for ready ignition thereby.

Other objects of the invention will be apparent when reading the following detailed description in connection with the drawings.

BRIEF DESCRIPTION OF DRAWINGS

FIG. 1 is a schematic transverse sectional view of a rotary combustion engine embodying the invention;

FIGS. 2 and 3 are sectional views taken along lines 2—2 and 3—3 respectively of FIG. 1;

FIG. 4 is a diagrammatic view showing a portion of FIG. 1 and also showing the fuel control and ignition systems; and FIG. 5 is an axial sectional view of one of the fuel injection pumps.

DESCRIPTION OF PREFERRED EMBODIMENTS

Referring to the drawing, particularly to FIGS. 1 to 3, a rotating combustion engine is schematically indicated at 10, the engine being generally similar to the type disclosed in said aforementioned prior patents. The engine 10 comprises an outer body or housing consisting of two axially spaced end housings 12 and 14 and an intermediate or rotor housing 16, the housings being secured together to form the engine cavity therebetween. An inner body or rotor 18 is journaled for rotation within said housing cavity on an eccentric portion 20 of a shaft 22 which extends coaxially through and is supported by bearings (not shown) in the end housings 12 and 14. The axis of the shaft 22 is perpendicular to the inner walls of the end housings 12 and 14.

The peripheral inner surface 24 of the intermediate housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 between the rotor and the housings 12, 14 and 16. For this purpose, each of the rotor apex portions is provided with a seal 30 which extends across the rotor between the inner walls of the end housings 12 and 14 and the rotor also has suitable seals 32 on its end faces for sealing contact with said end housing inner walls. Each of the three peripheral surfaces of the rotor preferably is provided with a trough-like recess 34.

The engine 10 also includes suitable gearing (not illustrated) between the rotor 18 and the engine housing to control the relative rotation of the rotor, such gearing is conventional and preferably is similar to that illustrated in the aforementioned prior patents.

An air intake passage 40 supplies air to an air intake port 42 disposed adjacent to and at one side of the junction 23 of the two lobes of the trochoidal peripheral surface 24. Said passage 40 extends through the intermediate housing 16 and the port 42 opens through the inner trochoidal surface 24 of intermediate housing 16. An exhaust port 44 is formed in the intermediate housing 16 adjacent to and on the opposite side of said junction 23. The engine combustion is initiated in the engine working chambers 28 in the vicinity of the other junction 25 of the two lobes of trochoidal surface 24.

The engine structure so far described is conventional and is generally similar to that illustrated in the aforementioned prior patents. Reference is made to said prior patents for further details of such an engine including, for example, details of the rotor seals and the gearing between the rotor and housing. With such an engine, during engine operation and with the rotor rotating clockwise, as viewed in FIG. 1, the volume of each working chamber 28 periodically increases from a minimum volume condition, when it is located adjacent to the lobe junction 23 and opens the intake port 42, to a maximum volume condition and closes the intake port and then said chamber decreases in volume to compress its intake charge until the working chamber again reaches a minimum volume condition, but this time at the lobe junction 25. Thereafter the volume of said chamber again increases to a maximum and then decreases to a minimum as the chamber comes into communication with the exhaust port at lobe junction 23 to complete the cycle.

A first fuel nozzle 50 is mounted on the intermediate housing 16 adjacent to the lobe junction 25. The fuel nozzle 50 has its fuel discharge end disposed in a recess opening to the trochoidal surface 24 for discharging fuel into each working chamber after the air-intake charge within the chamber has been substantially compressed and combustion is about to be initiated. A spark plug type igniter 52 is also mounted on the intermediate housing adjacent to the lobe junction 25 and adjacent to the nozzle 50. The electrodes of the spark plug 52 are disposed adjacent to the discharge end of the nozzle 50 preferably so that said nozzle discharge end and the spark plug electrodes both open through the trochoidal surface 24 through a common recess. In addition, the fuel nozzle 50 and spark plug 52 preferably are disposed so that at least a portion of the fuel vapor produced by fuel spray discharged from the nozzle passes in close proximity to said spark plug electrodes immediately as the fuel leaves the nozzle 50 for ready ignition by said spark plug.

The ignition circuit for the spark plug 52 is arranged to fire the spark plug while fuel is discharging from the nozzle 50 into a working chamber 28 so that a portion of this fuel is ignited at the fuel nozzle 50 as it discharges from the nozzle and the burning of this initial portion of the fuel discharged from the nozzle 50 ignites the balance of the fuel discharging from said nozzle. The timing of the spark from the spark plug 52 is such that it fires during the period of discharge from the nozzle 50 into a working chamber 28 and preferably during the initial period of such discharge into each working chamber 28.

In general the physical arrangement of the fuel nozzle 50 and spark plug 52 is similar to the fuel nozzle and spark plug arrangement disclosed in the aforementioned U.S. Pat. No. 3,246,636 except that in said prior patent all the engine fuel is discharged from this one nozzle. Also as in said prior patent, the engine air intake passage 40 preferably is characterized by the absence of any air throttle valve.

In accordance with the present invention, a second fuel nozzle 60 is mounted on the intermediate housing 16 also adjacent to the lobe junction 25 so that this second nozzle is adjacent to the fuel nozzle 50 and spark plug 52. Preferably, as illustrated, the second fuel nozzle 60 is disposed in a downstream direction from the first nozzle 50 relative to the direction of rotation of the rotor 18. Like the fuel nozzle 50, the fuel nozzle 60 has its discharge end disposed close to the trochoidal surface 24 so as to minimize the size of the recess at the trochoid surface 24 and to minimize leakage around the apex seals 30 as they pass over the nozzle recess at the trochoidal surface 24. As in the case of the nozzle 50, the second fuel nozzle 60 is arranged to initiate the discharge of its fuel into each working chamber 28 after the air charge in said chamber has been substantially compressed and combustion is about to be initiated, in a timely manner relative to discharge of fuel from the nozzle 50. For example, at low engine loads discharge of fuel from the main nozzle 60 into each working chamber 28 may be initiated somewhat after fuel is discharged from the nozzle 50 whereas at high engine loads in order to provide time for fuel discharge from the main nozzle 60, the fuel discharge from this main nozzle may be initiated somewhat before fuel is discharged from the pilot nozzle 50. As a result, the combustion flame resulting from the ignition by the spark plug 52 of the fuel discharging from the first nozzle 50 into each working chamber 28 is effective to ignite the fuel discharged from the second nozzle 60 into said chamber. Thus, the burning fuel discharged by the nozzle 50 functions as a pilot flame to ignite the fuel discharged by the nozzle 60.

Reference is now made to FIG. 4 for details of the ignition and fuel control systems. In FIG. 4 the rotor 18 is shown in a position in which one of the engine working chambers 28 (designated 28a in FIG. 4) is about to be fired. That is, the air intake charge in the chamber 28a has been substantially compressed and this chamber is just short of reaching its mimimum volume condition adjacent lobe junction 25, usually termed its top dead center position.

A pair of similar positive displacement pumps 70 and 72 are provided for discharging predetermined quantities of fuel from the nozzles 50 and 60 respectively into each working chamber 28. Cams 74 and 76, driven from the engine shaft 22 by means schematically indicated at 78, are arranged to activate the fuel pumps 70 and 72. As disclosed in said prior patents, the engine shaft 22 rotates at 3 times the speed of the rotor and therefore in order to supply fuel successively to each of the three working chambers 28 the shaft 22 is arranged to activate each fuel pump 70 and 72 once each revolution of the shaft. Accordingly, each of the pumps 70 and 72 is effective to discharge a predetermined quantity of fuel into each working chamber 28 each time the working chamber comes under the associated fuel nozzles 50 and 60 respectively.

The relative timing of the cams 74 and 76 may be varied by means (not shown) in accordance with changes in an engine operating condition such as speed and/or load to alter the relative initiation of fuel discharge from the two nozzles 50 and 60. Also instead of modifying the timing of cams 74 and 76, the pumps 70 and 72 could include conventional means to vary the time of initiation of their fuel discharge.

A third cam 82, also driven from the shaft 22, is arranged to operate the make-and-break contacts 84 of the ignition circuit. The ignition circuit illustrated is conventional and includes a coil, the primary 86 of this coil being connected to a battery 88, ignition switch 90 and the make-and-break contacts 84. The secondary 92 of the ignition coil is connected to the spark plug 52 by a line 94. The cam 82 is positioned so as to activate the spark plug 52 preferably at substantially the same time fuel begins to discharge from the nozzle 50. As already discussed, the spark plug 52 fires during fuel discharge from the nozzle 50 into a working chamber 28 and preferably during the initial portion of such discharge into each chamber.

Fuel is supplied to each fuel pump 70 and 72 from a common source including the fuel tank 100. From the fuel tank, the fuel is supplied to the pumps 70 and 72 by fuel lines 102 and 104 respectively. Fuel is supplied from the fuel tank 100 via the pumps 70 and 72 and fuel lines 106 and 108 to the fuel nozzles 50 and 60 respectively. Thus the fuel nozzles 50 and 60 do not require different fuels.

The fuel injection pumps 70 and 72 may be of the conventional type shown in aforementioned prior U.S. Pat. No. 3,246,636 and as illustrated in FIG. 5 for the pump 72. As shown in FIG. 5, the pump 72 includes a housing 110, a rotatable inner sleeve 112 and a reciprocal plunger 114 within said sleeve. The plunger is urged by a spring 116 to its downward position (as viewed in the drawing) against the cam 76. Fuel is supplied from the fuel passage 104 to an annulus 118 between the housing 110 and sleeve 112. The sleeve 112 has a radial passage 120 therethru from which fuel supplied to the annulus 118 discharges into the sleeve to fill the space within said sleeve between the head end of the plunger 114 and the adjacent end of the sleeve 112 which is closed by a check valve 122. When the plunger 114 is driven upwards by the cam 76 it slides over the passage 120 to close this passage whereupon this movement of the plunger 114 is effective to pump the fuel trapped above it through the check valve 122 and out through the line 108 to the fuel nozzle 60 for discharge therefrom into a working chamber 28.

The pump plunger 114 has a groove 124 in its side surface with said groove having a helical-like edge 126 so that the pumping action of the plunger 114 stops as soon as the edge 126 uncovers the passage 120. The sleeve 112 has external gear teeth 130 for meshing engagement with a rack 132. With this arrangement, linear motion of the rack is effective to rotate the sleeve 112. The rotative position of the sleeve 112 determines the point at which the groove side edge 126 uncovers port 120. Accordingly, by adjusting the position of the rack 132 the effective stroke of the pump 72 can be varied thereby regulating the quantity of fuel discharged by the pump 72 into each working chamber 28.

As illustrated, the pump 70 is generally similar to pump 72. However, if as hereinafter mentioned, a constant quantity of fuel is to be discharged by the fuel nozzle 50 into each working chamber 28, then the pump 70 would not need to include the rack illustrated in FIG. 4 (equivalent to the rack 132 of the pump 72) for adjusting the quantity of fuel discharged by the pump 70 each time its plunger is operated by the cam 74.

With the engine 10 and its ignition and fuel control systems described, as the engine operates and starting with a working chamber 28 increasing in volume in its intake phase, an air intake charge is supplied into said working chamber through the intake port 42. As already stated, the intake passage 40 leading to the intake port 42 has no throttle valve whereupon there are no throttle losses in the intake passage. All the air is supplied through the intake passage 40 and all the fuel preferably is supplied through the fuel nozzles 50 and 60.

After an air intake charge has been taken into a working chamber 28, the volume of the chamber decreases to compress the charge. When this chamber 28 reaches the position of chamber 28a in FIG. 4, the air charge is compressed almost to its maximum extent, the chamber 28 then being slightly short of its top dead center position. At this point a quantity of fuel is discharged into this chamber 28 from the fuel nozzle 50 and the spark plug 52 is energized during this fuel discharge preferably substantially as this fuel discharge begins. As a result, the fuel discharged from the nozzle 50 is ignited as it discharges. The burning of the initial portion of the fuel discharged from the nozzle 50 serves to ignite the balance of the fuel discharging from this nozzle. Fuel is also discharged from the nozzle 60 at about the same time. Accordingly, the burning fuel discharged from the pilot nozzle 50 serves to ignite the fuel discharged from the main nozzle 60. With the main nozzle 60 disposed downstream of the pilot nozzle 50, the motion of the air in each working chamber 28 resulting from rotation of the rotor 18 tends to carry the pilot flame (produced by burning of fuel from the nozzle 50) into the main fuel spray from the nozzle 60. The fuel discharge from the pilot and main nozzles 50 and 60 are so closely timed relative to each other so that detonation problems are minimized. Hence the present invention permits the use of low octane fuels such as kerosene and jet engine and Diesel-type fuels.

After combustion has been initiated within the working chamber 28, the balance of the expansion and exhaust phases of the cycle of said chamber are completed substantially as described in said aforementioned patents, the combustion gases exhausting through the exhaust port 44. Each of the other working chambers 28 go through the same cycle. Since ignition by the spark plug 52 and combustion takes place in a local fuel enriched region it is possible to operate the engine on a lean over-all fuel-air mixture thereby reducing the carbon monoxide and NOx in the engine exhaust and in general also the hydrocarbons.

With the fuel and ignition systems of aforementioned prior U.S. Pat. Nos. 3,246,636 and 3,698,364, all the fuel is discharged from a single fuel nozzle for ignition by an adjacent spark plug. With such prior systems, although the conditions within an engine working chamber may be ideal for ignition at a particular engine load and/or speed condition, the working chamber conditions may not be entirely satisfactory for ignition at other engine loads or speeds. With the present invention, however, since the main fuel supply is from the nozzle 60, and since the spark plug 52 only needs to ignite the fuel from the nozzle 50, it is possible to adjust the fuel discharged from the nozzle 50 into each working chamber for optimum ignition conditions independently of the engine load and/or speed. For example, it is possible to provide for fuel nozzle 50 to discharge a substantially constant quantity of fuel into each working chamber regardless of the engine power output or engine speed. Such an arrangement is preferred because of its simplicity since no variation of the effective stroke of the fuel pump 70 is then required with changes in engine power requirements. It may, however, be necessary to vary the effective stroke of the pump 70 because of possibly greater fuel leakage in the pump during the relatively slow pump operation at low engine speeds. However, the amount of any such variation, with engine speed, of the fuel discharge from the pump 70 and its pilot nozzle 50 would be small. Therefore, substantially the entire regulation of the power output of the engine is effected by adjustment of the rack 132 of the fuel pump 72 for varying the quantity of fuel discharged from the main fuel nozzle 60 into each working chamber 28. For example, during engine idling operation, the ratio of the quantity of fuel discharged from the nozzles 50 and 60 into each working chamber 28 may be 1:1 whereas at full load this ratio could be 1:9 Also it may be desirable to vary the quantity of fuel discharged from the nozzle 50 into each working chamber 28 to some extent with changing engine operating conditions.

In the fuel and ignition systems of said prior two U.S. Pat. Nos. (3,246,636 and 3,698,364) the timing of the ignition and the main fuel supply delivery cannot be adjusted independently of each other. In the present invention, the timing of the main fuel supply from the nozzle 60 and the timing of the firing of the spark plug 52 can be varied within limits independently of each other. This is so because in the present invention, timing of the firing of spark plug 52 is related primarily only to discharge of fuel from the fuel nozzle 50 which as stated preferably is independent of engine operating conditions.

The fuel nozzle 50 preferably has only one orifice and therefore it discharges fuel in a single conical jet into each working chamber 28 as illustrated in FIGS. 1 and 2. The nozzle 60, however, preferably has a showerhead-type of spray pattern, for example, as shown in aforementioned prior U.S. Pat. No. 3,698,364 for not only spreading the fuel axially across each working chamber 28 but also for spreading fuel circumferentially across each chamber 28 as indicated in FIGS. 1 and 3.

The invention clearly is not limited to the specific rotary engine configuration illustrated. For example, the intake passage 40 could pass through one of the end housings 12 or 14 instead of through the intermediate housing 16 with the port 42 opening into the engine cavity through an inner wall of this end housing. Such an intake port configuration is shown in the aforementioned prior patents. Also, although the type of fuel pumps 70 and 72 illustrated are for liquid type fuels it is within the scope of the invention to use a fuel which is gaseous at normal atmospheric pressure and temperature conditions. Suitable liquid fuels would include not only gasoline but heavier fuels such as kerosene or diesel and jet engine-type fuels. In addition, the trochoidal surface 24 could have more than two lobes with the number of apex portions on the rotor 18 increasing correspondingly. Such rotary engine variations are fully described in aforementioned prior U.S. Pat. No. 2,988,065.

It should be understood that this invention is not limited to the specific details of construction and arrangement thereof herein illustrated and that changes and modifications may occur to one skilled in the art without departing from the spirit or scope of the invention.

What is claimed is:

1. The method of operating a rotary combustion engine of the type having an outer body and with an internal cavity having a multi-lobe peripheral surface and an inner body mounted within said outer body cavity for relative rotation therein and having a plurality of apex portions having sealing cooperation with said multi-lobe surface to form a plurality of working chambers between said inner and outer bodies, the volume of said chambers increasing and decreasing in response to relative rotation of said inner and outer bodies, said method of operation comprising the steps:

a. supplying air successively into said working chamber so that the air is introduced into each chamber as said chamber is expanding;

b. compressing said air in response to a subsequent decrease in volume of said chamber;

c. discharging fuel from a first fuel nozzle into each working chamber after the air therein has at least been partially compressed;

d. igniting the fuel discharge from said first nozzle adjacent to its point of discharge into said chamber;

e. discharging additional fuel from a second fuel nozzle into each working chamber also after the air therein has at least been partially compressed, at least a portion of the fuel from said second nozzle discharging into generally the same region in each working chamber as the fuel discharged from the first nozzle so that the burning of the fuel discharge from the first nozzle is promptly effective to cause ignition of the fuel discharging from the second nozzle;

f. expanding the resulting combustion gases in said chamber as the volume of said chamber subsequently increases; and g. thereafter exhausting said combustion gases from said chamber.

2. The method recited in claim 1 in which the air supply through said intake passage is characterized by being unthrottled and in which the power output of the engine is controlled by varying the quantity of fuel discharging into each working chamber from the second fuel nozzle.

3. A rotary combustion engine comprising:

a. an outer body having an internal cavity, the peripheral surface of which has a multi-lobe profile, said outer body also having an air-intake passage and a combustion gas exhaust passage;

b. an inner body of generally polygonal profile mounted for relative rotation within said outer body, the apex portions of said inner body having sealing cooperation with said peripheral surface to define a plurality of working chambers which vary in volume in response to said relative rotation;

c. a first fuel nozzle mounted on said outer body for discharging fuel into each working chamber after the air charge therein has been substantially compressed;

d. an igniter mounted on said outer body adjacent to said first fuel injection nozzle for igniting fuel discharging from first nozzle; and e. a second fuel injection nozzle also mounted on said outer body for discharging additional fuel into each working chamber also after the air charge therein has been substantially compressed, said second nozzle being arranged to discharge at least a portion of its fuel into each working chamber in generally the same region as the fuel discharge from the first nozzle so that the burning of the fuel discharged from the first nozzle is effective promptly to cause ignition of the fuel discharging from the second nozzle.

4. A rotary combustion engine as claimed in claim 3 and including means for varying the quantity of fuel discharged by said second nozzle into each working chamber so as to vary the engine power output.

5. A rotary combustion engine as claimed in claim 4 and in which said intake passage is characterized by the absence of any air throttle valve.

6. A rotary combustion engine as claimed in claim 4 in which said first fuel nozzle discharges through a recess in the inner surface of the outer body and said igniter has its electrodes disposed in said recess adjacent to the discharge end of the first nozzle and in which the second fuel nozzle is disposed downstream of the first fuel nozzle relative to the direction of rotor rotation.

7. A rotary combustion engine as claimed in claim 4 and in which the quantity of fuel discharged by said first fuel nozzle into each working chamber remains substantially constant independent of the power output of the engine.

8. A rotary combustion engine as claimed in claim 4 and in which said second fuel nozzle has a plurality of discharge orifices to provide a showerhead-type of spray pattern for discharging fuel in various directions into each working chamber and said first fuel nozzle has a single discharge orifice.

* * * * *